United States Patent Office 3,538,075
Patented Nov. 3, 1970

3,538,075
DISAZO DYES FROM BIS-p,p'-DIAMINO-ALKYL-ENEDICARBOXYLIC ACID ANILIDES
Johannes Dehnert and Gerhard Gnad, Ludwigshafen (Rhine), Germany, assignors to Badische Anilin- & Soda-Fabrik Aktiengesellschaft, Ludwigshafen (Rhine), Germany
No Drawing. Filed Nov. 29, 1967, Ser. No. 686,751
Claims priority, application Germany, Dec. 3, 1966, 1,544,418
Int. Cl. C09b 31/04; D06p 1/02
U.S. Cl. 260—184                                    5 Claims

ABSTRACT OF THE DISCLOSURE

Disazo dyes derived from bis-p,p'-diamino-alkylenedicarboxylic acid anilides and p-substituted hydroxybenzenes. They are especially useful for dyeing polyesters, polyurethanes and polyamides.

The invention relates to dyestuffs of the general Formula Ia:

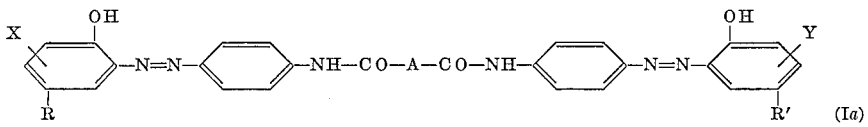

in which A denotes a straight-chain or branched alkylene radical having four to seventeen carbon atoms or a cycloalkylene radical, R denotes an alkyl radical having one to four carbon atoms or an acylamino group having one to four carbon atoms, R' denotes an alkyl radical having one to four carbon atoms or an acylamino group having one to four carbon atoms, X denotes hydrogen atom or an alkyl group having one or two carbon atoms, and Y denotes a hydrogen atom or an alkyl group having one or two carbon atoms.

Examples of substituents R and R' are methyl, ethyl, propyl, iso-propyl, n-butyl, t-butyl, acetylamino or propionylamino. The acylamino groups may form part of a ring, for example in the pyrrolidonyl group.

X and R or Y and R' may together form part of a ring, for example when a tetramethylene or trimethylene bridge is attached to the hydroxybenzene radical. Examples of substituents X and Y are methyl or ethyl.

Especially valuable dyes have the general Formula Ib:

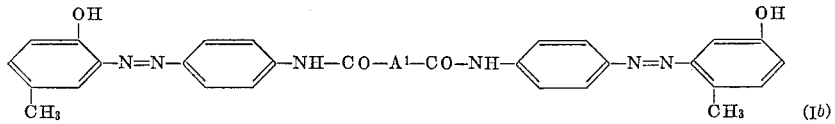

in which $A^1$ denotes a straight-chain alkylene radical having from four to twelve carbon atoms or a cyclohexylene radical. The new dyes may be obtained by coupling a tetrazonium salt of a diamine having the general Formula IIa or IIb:

(IIa)
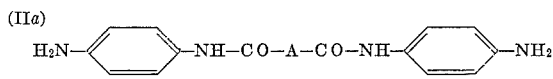

or (IIb)
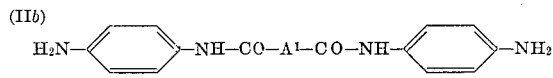

which is free from sulfonic acid radicals and in which A and $A^1$ have the above meanings, with a hydroxybenzene which bears a substituent in para-position and is also free from sulfonic acid groups.

The aromatic diamines having the general Formula IIa or IIb may be obtained for example by reaction of the corresponding dicarboxylic dichlorides

or

with p-nitraniline followed by reduction of the nitro groups to amino groups. The tetrazonium salts may be obtained in the conventional way by tetrazotizing the diamines in aqueous hydrochloric acid.

Examples of starting materials for the compounds having the formula

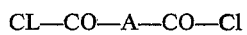

and

are adipic acid, pimelic acid, suberic acid, sebacic acid, dodecane-1,12-dicarboxylic acid, heptadecane-1,8-dicarboxylic acid, heptadecane-1,9-dicarboxylic acid, cyclohexane-1,4-dicarboxylic acid or mixtures of such compounds.

Examples of hydroxybenzenes bearing substituents in para-position are:

4-methyl-1-hydroxybenzene,
4-tertiary-butyl-1-hydroxybenzene,
2,4-dimethyl-1-hydroxybenzene,
3,4-dimethyl-1-hydroxybenzene,
4,5-tetramethylene-1-hydroxybenzene,
4-acetylamino-1-hydroxybenzene,
4-propionylamino-1-hydroxybenzene,
2-acetylamino-4-methyl-1-hydroxybenzene and
4-(1'-pyrrolidon-(2')-yl)-1-hydroxybenzene.

Coupling of the tetrazonium salts with the hydroxybenzenes capable of coupling in ortho-position to the hydroxy group is advantageously carried out in aqueous alkaline solution with an addition of an acid-binding agent, such as sodium hydroxide, sodium carbonate or sodium hydrogen carbonate.

The new disazo dyes obtainable by the process according to this invention are insoluble in water. They are more or less soluble in organic solvents depending on the length of the dicarboxylic acid radical. They are suitable for dyeing plastics and lacquers as well as for dyeing and printing textile material, such as fibers, flock, filaments, threads, knitted, woven or nonwoven textiles, or moldings of cellulose esters, cellulose ethers or synthetic fiber-forming materials, such as polyacrylonitrile and copolymers of acrylonitrile. Very fast dyeings are obtained with these disazo dyes particularly on textile materials of linear polyamides, polyurethanes or polyesters.

In order to prepare dyeings having great depth of color it is advantageous to use mixtures of dyes which have been obtained by using mixtures of diamines having the general Formula IIa or IIb or mixtures of hydroxybenzenes. Another possibility is to start from mixtures of diamines and mixtures of hydroxybenzenes.

Dyeings or prints obtained on polyamides and polyesters with the new dyes or dye mixtures are distinguished by very good light and wet fastness and by outstanding thermal resistance. Dyeings obtained with mixtures of dyes are of particular technical interest.

The invention is further illustrated by the following examples, in which parts and percentages are by weight unless otherwise stated.

EXAMPLE 1

34 parts of pimelic acid bis-(4-aminophenylamide) is stirred into a mixture of 600 parts of ice-water and 50 parts by volume of concentrated hydrochlorid acid at 0° to 5° C. 60 parts by volume of 23% sodium nitrite solution is allowed to flow in slowly at the same temperature. The whole is stirred for another two hours and then any excess of nitrous acid present is removed in the conventional manner. The solution is then gradually added at 0° to 5° C., while adding 350 parts of ice, to a solution of 22.7 parts of 4-methyl-1-hydroxybenzene, 20 parts of 50% caustic soda solution and 30 parts of sodium carbonate in 600 parts of water. After coupling is completed, the dye is suction filtered, washed with water and dried at 70° C. It is obtained as a deep yellow powder which dissolves in dimethyl formamide with a yellow color and gives on polyester cloth yellow dyeings distinguished by excellent fastness properties.

Other dyes having similar properties may be prepared in the same way from the tetrazo components and coupling components indicated in the following table:

sulfonated sperm oil in 2000 parts of water for ninety minutes at 95° to 100° C. A pure yellow dyeing is obtained which has very good light fastness and wet fastness and excellent resistance to heat setting.

100 parts of polyethylene terephthalate fibers are dyed for sixty minutes at 125° C. in a pressure apparatus in a liquor containing 2000 parts of water, 0.8 part of a finely divided mixture of the dyes from Examples 1 and 2 in the ratio by weight of 1.5:1 and 2 parts of the sulfonated adduct of 80 moles of ethylene oxide to 1 mole of sperm oil alcohol. A pure yellow dyeing is obtained having excellent thermal resistance and outstanding light fastness and wet fastness.

EXAMPLE 11

34 parts of pimelic acid bis - (4-aminophenylamide) is tetrazotized as described in Example 1. The solution is then added gradually at a temperature of 0° to 5° C. with an addition of 300 parts of ice to a solution of 11.3 parts of 4 - methyl - 1 - hydroxybenzene, 12.8 parts of 2,4-dimethyl - 1 - hydroxybenzene, 20 parts of 50% caustic soda solution and 30 parts of sodium carbonate in 600 parts of water. After coupling is over, the dye mixture is isolated and dried as described in Example 1. A deep yellow powder is obtained which in finely divided form dyes polyamide cloth yellow shades having very good fastness properties.

EXAMPLE 12

A mixture of 16.3 parts of adipic acid bis - (4 - aminophenylamide) and 16.3 parts of pimelic acid bis-(4-aminophenylamide) is tetrazotized as described in Example 11 and coupled onto a mixture of 11.3 parts of 4-methyl-

| Example No. | Tetrazo component | Coupling component (hydroxybenzene) | Material dyed | Shade |
|---|---|---|---|---|
| 2 | $H_2N-\langle\rangle-NHCO(CH_2)_4CONH-\langle\rangle-NH_2$ | $HO-\langle\rangle-CH_3$ | Polyester | Yellow. |
| 3 | $H_2N-\langle\rangle-NHCO(CH_2)_4CONH-\langle\rangle-NH_2$ | $HO-\langle\rangle-NHCOCH_3$ | Polyamide | Do. |
| 4 | $H_2N-\langle\rangle-NHCO(CH_2)_5CONH-\langle\rangle-NH_2$ | $HO-\langle\rangle-CH_3$ (with $CH_3$) | Polyester | Do. |
| 5 | $N_2H-\langle\rangle-NHCO(CH_2)_5CONH-\langle\rangle-NH_2$ | $HO-\langle\rangle-CH_3$ (with $CH_3$) | do | Do. |
| 6 | $N_2N-\langle\rangle-NHCO(CH_2)_5CONH-\langle\rangle-NH_2$ | $HO-\langle\rangle-C(CH_3)_3$ | do | Do. |
| 7 | $H_2N-\langle\rangle-NHCO(CH_2)_6CONH-\langle\rangle-NH_2$ | $HO-\langle\rangle-CH_3$ | do | Do. |
| 8 | $H_2N-\langle\rangle-NHCO(CH_2)_8CONH-\langle\rangle-NH_2$ | $HO-\langle\rangle-CH_3$ | do | Do. |
| 9 | $H_2N-\langle\rangle-NHCO(CH_2)_{12}CONH-\langle\rangle-NH_2$ | $HO-\langle\rangle-CH_3$ | do | Do. |
| 10 | $H_2N-\langle\rangle-NHCO-\langle H \rangle-CONH-\langle\rangle-NH_2$ | $HO-\langle\rangle-CH_3$ | do | Do. |

To dye a polyamide cloth weighing 100 parts it is treated for example in a liquor containing 1 part of a mixture of the dyes from Examples 1, 4 and 10 in the ratio by weight of 1:1:1 in a finely divided form and 2 parts of 1 - hydroxybenzene and 12.8 parts of 2,4 - dimethyl-1-hydroxybenzene. The dye mixture is obtained as a deep yellow powder which gives yellow dyeings having very good fastness on polyamide cloth and polyester cloth.

We claim:
1. A compound of the formula

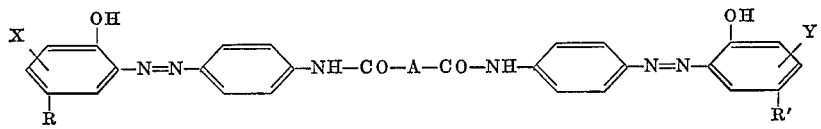

in which A denotes a straight-chain alkylene radical having four to twelve carbon atoms or a cyclohexylene radical, R and R' each denote alkyl of one to four carbon atoms or acetylamino, and X and Y each denote hydrogen or alkyl of one to two carbon atoms.

2. A compound of the formula

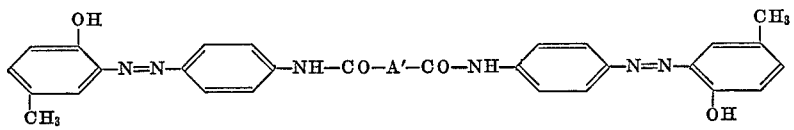

in which A' denotes a member selected from the group consisting of straight-chain alkylene of four to twelve carbon atoms and cyclohexylene.

3. The compound of the formula

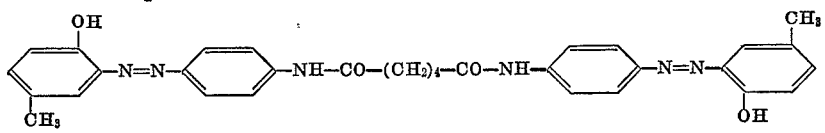

4. The compound of the formula

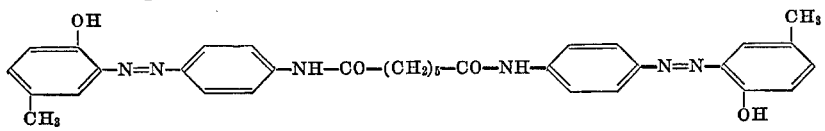

5. The compound of the formula

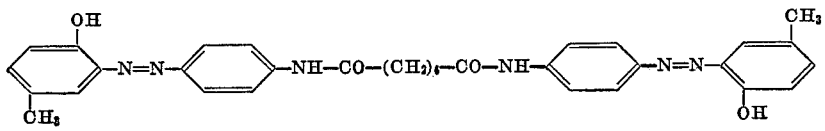

References Cited
UNITED STATES PATENTS 2,899,305   8/1959   Bossard et al. _____ 260—184 X CHARLES B. PARKER, Primary Examiner D. M. PAPUGA, Assistant Examiner U.S. Cl. X.R.

260—558; 8—4, 26, 41, 55

PO-1050
(5/69)

UNITED STATES PATENT OFFICE
CERTIFICATE OF CORRECTION

Patent No. 3,538,075          Dated November 3, 1970

Inventor(s) Johannes Dehnert et al

It is certified that error appears in the above-identified patent and that said Letters Patent are hereby corrected as shown below:

Column 3, in the table, under "Tetrazo component", formula 5, that portion of the formula reading "$N_2H$" should read -- $H_2N$ --; formula 6, that portion of the formula reading "$N_2N$" should read -- $H_2N$ --.

SIGNED AND
SEALED
FEB 2 1971

(SEAL)
Attest:

Edward M. Fletcher, Jr.
Attesting Officer

WILLIAM E. SCHUYLER, JR.
Commissioner of Patents